US012572208B1

(12) United States Patent
Abi-Farah

(10) Patent No.: US 12,572,208 B1
(45) Date of Patent: Mar. 10, 2026

(54) BRAIN-COMPUTER INTERFACE (BCI) SYSTEM WITH DEEP LEARNING FOR TRANSMITTING COMMUNICATIONS VIA A TELECOMMUNICATIONS NETWORK

(71) Applicant: BOOST SUBSCRIBERCO L.L.C., Englewood, CO (US)

(72) Inventor: Bassem Abi-Farah, Littleton, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 0 days.

(21) Appl. No.: 19/047,448

(22) Filed: Feb. 6, 2025

(51) Int. Cl.
*G06F 3/01* (2006.01)
*G06F 3/16* (2006.01)
*G06N 3/08* (2023.01)
*H04W 4/14* (2009.01)

(52) U.S. Cl.
CPC .............. *G06F 3/015* (2013.01); *G06F 3/016* (2013.01); *G06F 3/167* (2013.01); *G06N 3/08* (2013.01); *H04W 4/14* (2013.01)

(58) Field of Classification Search
CPC .......... G06F 3/015; G06F 3/016; G06F 3/167; G06N 3/08; H04W 4/14
See application file for complete search history.

(56) References Cited

U.S. PATENT DOCUMENTS

2020/0268296 A1* 8/2020 Alcaide ................... G06F 3/013
2021/0192140 A1* 6/2021 Galley ................... G06N 3/044

2024/0202518 A1* 6/2024 Eisner ...................... G06N 3/08
2024/0248926 A1* 7/2024 Agrawal ............... G06F 16/435
2024/0267344 A1* 8/2024 Mulligan ............. H04L 51/214
2024/0291779 A1* 8/2024 Catalano ................ H04L 51/52
2024/0354555 A1* 10/2024 Knipfing ............. G06N 3/0455
2024/0354641 A1* 10/2024 Miller ................... G06N 3/045
2024/0355064 A1* 10/2024 Skrypnyk ............... G06T 17/20
2024/0355065 A1* 10/2024 Miller .................. G06T 19/006
2024/0355131 A1* 10/2024 Kuppersmith ........... G06T 1/60
2024/0356871 A1* 10/2024 Brewer .................. H04L 51/04
2024/0356873 A1* 10/2024 Brewer ................ H04L 51/216
2025/0093951 A1* 3/2025 Alcaide .............. G06F 3/04842

* cited by examiner

*Primary Examiner* — Dmitriy Bolotin
(74) *Attorney, Agent, or Firm* — Quarles & Brady, LLP

(57) ABSTRACT

Systems and methods to implement a wearable brain computer interface (BCI) device for transmitting communications via a telecommunications network. One system includes a processing system of a wearable BCI device that is configured to receive an electrical signal related to neurological activity. The processing system may be configured to provide the electrical signal to a machine learning model, the machine learning model to extract a pattern from the electrical signal and determine, based on the pattern, an intent of the electrical signal. The processing system may be configured to receive, from the machine learning model, intent data related to the intent of the electrical signal. The processing system may be configured to encode the intent data to generate encoded data compatible for transmission via a 5G NR network. The processing system may be configured to transmit the encoded data via the 5G NR network to a recipient user equipment.

20 Claims, 7 Drawing Sheets

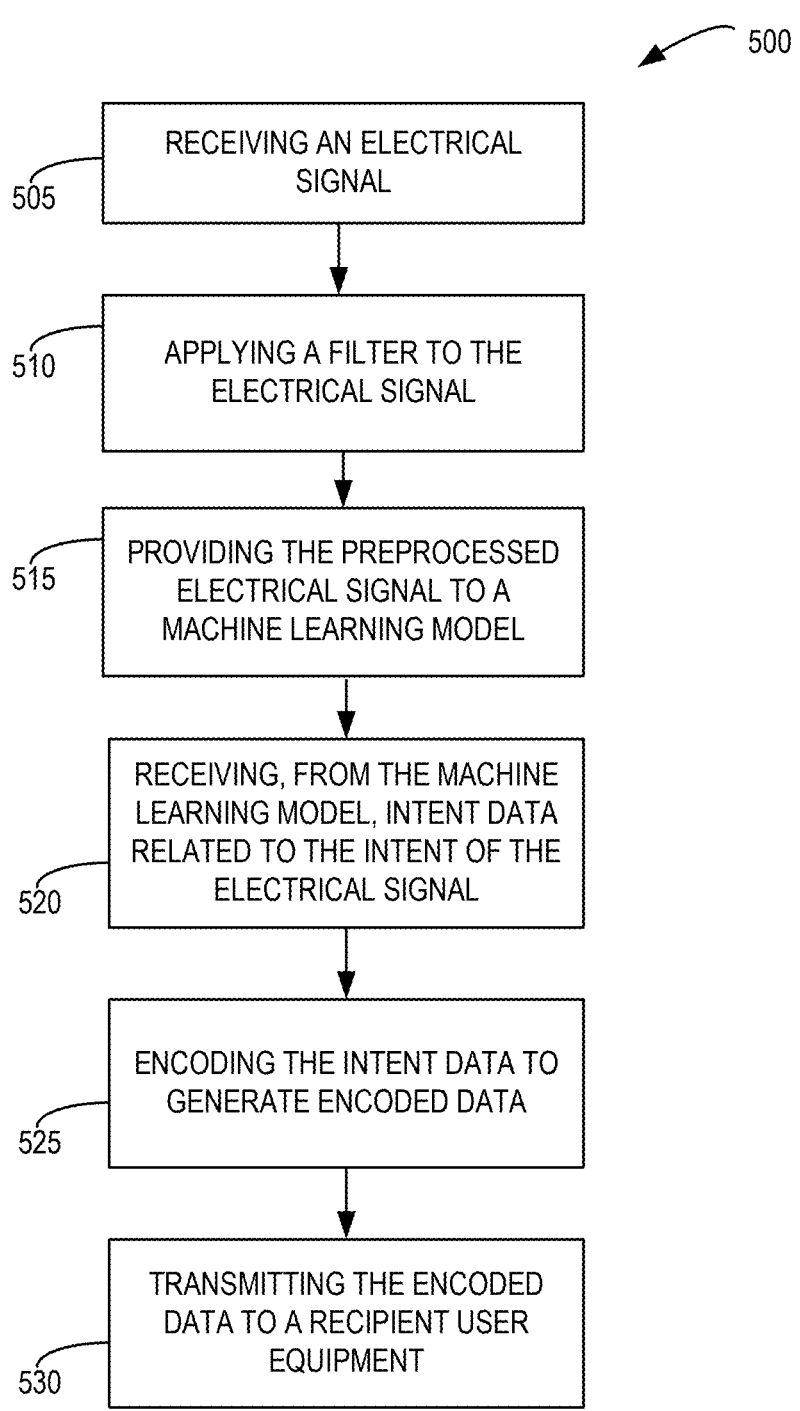

500

505    RECEIVING AN ELECTRICAL SIGNAL

510    APPLYING A FILTER TO THE ELECTRICAL SIGNAL

515    PROVIDING THE PREPROCESSED ELECTRICAL SIGNAL TO A MACHINE LEARNING MODEL

520    RECEIVING, FROM THE MACHINE LEARNING MODEL, INTENT DATA RELATED TO THE INTENT OF THE ELECTRICAL SIGNAL

525    ENCODING THE INTENT DATA TO GENERATE ENCODED DATA

530    TRANSMITTING THE ENCODED DATA TO A RECIPIENT USER EQUIPMENT

FIG. 5

BRAIN-COMPUTER INTERFACE (BCI) SYSTEM WITH DEEP LEARNING FOR TRANSMITTING COMMUNICATIONS VIA A TELECOMMUNICATIONS NETWORK

BACKGROUND

Wireless networks that transport digital data and telephone calls are becoming increasingly sophisticated. Currently, fifth generation (5G) broadband cellular networks are being deployed around the world. These 5G networks use emerging technologies to support data and voice communications with millions, if not billions, of mobile phones, computers, and other devices. 5G technologies are capable of supplying much greater bandwidths than previously available technologies.

The discussion above is merely provided for general background information and is not intended to be used as an aid in determining the scope of the claimed subject matter.

SUMMARY

Various aspects of the present disclosure relate to a brain-computer interface (BCI) system with deep learning for transmitting communications via a telecommunications network, and, in particular, to an enhanced non-invasive BCI system with deep learning for short message service (SMS) transmission using an embedded subscriber identity module (eSIM) and 5G new radio (NR) technology.

According to one aspect of the present disclosure, a wearable brain computer interface (BCI) device for transmitting communications via a telecommunications network. The BCI device may include an electrode to measure neurological activity of a user wearing the BCI device, where the electrode may be in contact with the user. The BCI device may include a model database to store a first machine learning model, the first machine learning model to determine an intent related to the neurological activity of the user. The MCI device may include a communication interface to couple the BCI device to the telecommunications network based on subscriber identity data of an embedded subscriber identity module (eSIM) of the BCI device. The BCI device may include a processing system including one or more electronic processors. The processing system may be coupled to the electrode. The processing system may be configured to receive an electrical signal from the electrode. The processing system may be configured to apply a filter to the electrical signal to generate a preprocessed electrical signal. The processing system may be configured to provide the preprocessed electrical signal to the first machine learning model, the machine learning model to extract a pattern from the preprocessed electrical signal and determine, based on the pattern, an intent of the electrical signal. The processing system may be configured to receive, from the first machine learning model, intent data related to the intent of the electrical signal. The processing system may be configured to encode the intent data to generate encoded data that is compatible for transmission via the telecommunications network. The processing system may be configured to transmit, via the communication interface, the encoded data via the telecommunications network to a recipient user equipment.

According to another aspect of the present disclosure, a system to implement a wearable brain computer interface (BCI) device for transmitting communications via a telecommunications network. The system may include a processing system of the wearable BCI device. The processing system may include one or more electronic processors to: receive an electrical signal from an electrode of the wearable BCI device, the electrode to measure neurological activity of a user wearing the wearable BCI device; provide the electrical signal to a machine learning model, the machine learning model to extract a pattern from the electrical signal and determine, based on the pattern, an intent of the electrical signal; receive, from the machine learning model, intent data related to the intent of the electrical signal; encode the intent data to generate encoded data that is compatible for transmission via a fifth generation (5G) new radio (NR) telecommunications network; and transmit, via a communication interface of the wearable BCI device, the encoded data via the 5G NR telecommunications network to a recipient user equipment, where the encoded data is transmitted as a short message service (SMS) message based on subscriber identity data of an embedded subscriber identity module (eSIM) of the wearable BCI device.

According to another aspect of the present disclosure, a method to implement a wearable brain computer interface (BCI) device for transmitting communications via a telecommunications network. The method may include receiving, with a processing system of the wearable BCI device, the processing system including one or more electronic processors, an electrical signal from an electrode of the wearable BCI device, the electrode to measure neurological activity of a user wearing the wearable BCI device. The method may include applying, with the processing system, a filter to the electrical signal to generate a preprocessed electrical signal. The method may include providing, with the processing system, the preprocessed electrical signal to a machine learning model, the machine learning model to extract a pattern from the preprocessed electrical signal and determine, based on the pattern, an intent of the electrical signal. The method may include receiving, with the processing system, from the machine learning model, intent data related to the intent of the electrical signal. The method may include encoding, with the processing system, the intent data to generate encoded data that is compatible for transmission as a short message service (SMS) message via the telecommunications network. The method may include transmitting, with the processing system, the SMS message via the telecommunications network to a recipient user equipment.

BRIEF DESCRIPTION OF THE DRAWINGS

The following drawings are provided to help illustrate various features of examples of the disclosure and are not intended to limit the scope of the disclosure or exclude alternative implementations.

FIG. 5 schematically illustrates an example of a push-to-talk (PTT) server in accordance with various aspects of the present disclosure.

FIG. 5 is a flowchart of an example method to implement a wearable BCI device for transmitting communications via a telecommunications network in accordance with various aspects of the present disclosure.

DETAILED DESCRIPTION

Figure 1:
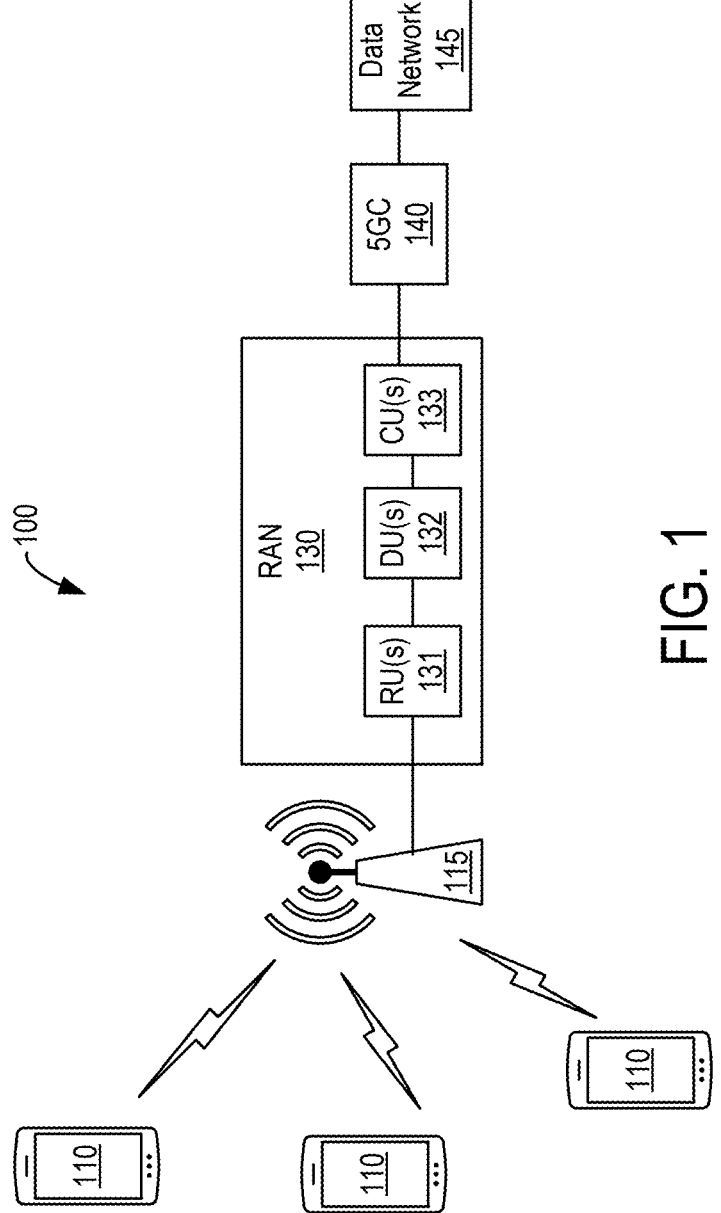
FIG. 1 illustrates an example of a telecommunications network in accordance with various aspects of the present disclosure.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

The present disclosure is directed to wireless communications networks, also referred to herein as telecommunications networks. The wireless communications networks described herein may represent a portion of a wireless network built around 5G standards promulgated by standards setting organizations under the umbrella of the Third Generation Partnership Project ("3GPP"). Accordingly, in some configurations, the wireless communication network may be a 5G network, such as, e.g., a 5G cellular network. Such 5G networks, including the wireless communication networks described herein, may comply with industry standards, such as, e.g., the Open Radio Access Network (Open RAN or O-RAN) standard that describes interactions between the network and user equipment (UE) (e.g., mobile phones and the like). As another example, the wireless communication networks described herein may comply with other industry standards, such as, e.g., the Distributed Radio Access Network (Distributed RAN or D-RAN) or the like. In some configurations, the wireless communication network may be another type of wireless network, such as, for example, a sixth generation (6G), wireless network.

D-RAN enables the distribution of radio access functions and the separation of control and user plane functions, which allows for the deployment of RAN functions in various locations, such as, e.g., remote radio heads (RRHs) and baseband units (BBUs). The BBUs may process the control plane functions and the user plane functions and the RRHs may handle radio frequency (RF) processing. Accordingly, D-RAN allows for the deployment of virtualized RAN functions such that RAN functions can be executed as software via a cloud infrastructure.

The O-RAN model follows a virtualized model for a 5G wireless architecture in which 5G base stations, referred to as next-generation Node Bs (gNBs), are implemented using separate centralized units (CUs), distributed units (DUs), and radio units (RUs). In some configurations, O-RAN CUs and DUs may be implemented using software modules executed by distributed (e.g., cloud) computing hardware. Virtualization allows for various other components of the cellular network, such as cellular network core functions, to be implemented as code that is executed using computing resources. Such computing resources can be part of a public cloud-computing platform that provides virtual private clouds (VPCs) for multiple clients. On a hybrid cloud cellular network, RAN components of the cellular network are in communication with components of the cellular network executed on a public cloud computing platform, such as, e.g., Amazon Web Services (AWS), Azure, Google Cloud, or any private or public cloud(s).

Accordingly, the technology disclosed herein provides methods and systems to implement a brain-computer interface (BCI) system with deep learning for transmitting communications via a telecommunications network. In some configurations, the technology disclosed herein relates to an enhanced non-invasive BCI system with deep learning for short message service (SMS) transmission using an embedded subscriber identity module (eSIM) and 5G new radio (NR) technology.

The intersection of neuroscience and telecommunications has resulted in advanced communication technologies, such as, e.g., BCI (also referred to as brain-machine interface (BMI)). BCI creates a communication link between neurological activity (as represented via electrical signals or brain electrical signals) and an external device. The technology disclosed herein may relate to a BCI system capable of converting brain electrical signals into data that can be sent as an SMS message using an embedded subscriber identity module (eSIM) and 5G New NR technology As described in greater detail therein, the technology disclosed herein further refines and enhances performance by utilizing deep learning. For example, in some instances, the technology may integrate a deep learning model (e.g., into the BCI system) to, for example, improve the interpretation of brain electrical signals before transmission thereof. In some configurations, the technology described herein may leverage non-invasive electroencephalogram (EEG) technology to capture brain electrical signals. Alternatively, or in addition, in some configurations, the technology disclosed herein may processes electrical signals with advanced technology (e.g., artificial intelligence or machine learning models or functionality). Alternatively, or in addition, in some configurations, the technology disclosed herein may transmit the interpreted data as an SMS transmission via 5G NR using an eSIM. The integration of deep learning models enhances the accuracy and reliability of the data interpretation, allowing for more precise communication and interaction.

Accordingly, in some configurations, the technology disclosed herein may provide a BCI system configured to interface with external devices (e.g., another UE or user device) using SMS via 5G NR using an eSIM.

As such, in some configurations, the technology disclosed herein may provide a BCI system (or device) that includes, e.g., a wearable, non-invasive device for capturing brain electrical activity (also referred to herein as neurological activity). As one example, the wearable BCI device may be an electroencephalography (EEG) headset wearable by a user (e.g., positioned on a head or skull of the user). As described in greater detail herein, in some configurations, the BCI system may include a variety of components, such as, e.g., a signal processing unit, a deep learning interpretation module, a data encoder, an eSIM module, a 5G NR communication module, an SMS gateway, etc. As described in greater detail herein, in some configurations, the signal processing unit may filter and preprocess raw electrical signal data (e.g., raw EEG data); the deep learning interpretation module may enhance signal interpretation and pattern recognition; the data encoder may convert interpreted signals into SMS-compatible data; the eSIM module may connect the BCI system to a 5G NR network; the 5G NR communication module may facilitate high-speed, low-latency SMS transmission; the SMS gateway may ensure delivery of the SMS message to a recipient UE. In some configurations, each component of the BCI system may work in harmony to ensure that brain signals are accurately captured, interpreted, and transmitted with minimal latency.

In some instances, one or more components of the BCI system may be local to the wearable BCI device. Alternatively, in some instances, one or more components of the BCI system may be remote (or external) to the wearable BCI device. As one example, the signal processing unit, the data encoder, the eSIM module, the 5G NR communication module, and the SMS gateway may be local to the wearable BCI device while the deep learning interpretation module may be remote (or external) to the wearable BCI device. In such examples, the deep learning interpretation module may be accessible to the wearable BCI device, such as, e.g., from a server or other component of the telecommunications network (e.g., a cloud server of a 5G NR telecommunications network).

FIG. 1 illustrates an example of a telecommunications network 100 in accordance with various aspects of the present disclosure. In the telecommunications network 100 of FIG. 1, one or more user equipment (UE) 110 may be connected to a wireless access point 115, which in turn may be connected to a radio access network (RAN) 130, including, e.g., one or more radio units (RUs) 131, distributed units (DUs) 132, centralized units (CUs) 133, or a combination thereof. In some configurations, the RAN 130 may be implemented as a virtualized RAN 130. As noted herein, the O-RAN model follows a virtualized model for a 5G wireless architecture in which 5G base stations (e.g., gNBs) are implemented using separate CUs, DUs, and RUs. In some configurations, O-RAN CUs and DUs may be implemented using software modules executed by distributed (e.g., cloud) computing hardware. Virtualization allows for various other components of the cellular network, such as cellular network core functions, to be implemented as code that is executed using computing resources. Accordingly, in some configurations, the RAN 130 may be implemented in accordance with the O-RAN model, such that the RUs 131, the DUs 132, or CUs 133 may be O-RAN RUs, CUs, or DUs. The RAN 130 may provide a connection to a 5G core network (5GC) 140, which in turn may provide a connection to a data network 145, another component or device, or a combination thereof. The data network 145 may be the Internet, an enterprise data network, combinations thereof, or the like. The wireless access point 115 and the RAN 130 may collectively be referred to as a next-generation RAN (NG-RAN).

In some configurations, the telecommunications network 100 may be a standalone (SA) network (e.g., a 5G SA network) that utilizes 5G cells for both signaling and information transfer via a 5G packet core architecture. However, the present disclosure may be implemented with any type of telecommunication network, including, e.g., a telecommunication network capable of being virtualized. For instance, in some implementations, the telecommunication network 100 may be implemented using one or more virtualized RAN components, such as, e.g., one or more virtualized RUs, virtualized DUs, virtualized CUs, or a combination thereof. In some configurations, the telecommunication network 100 may be implemented pursuant to the O-RAN model, as described herein. Accordingly, in some instances, the telecommunications network 100 may be an O-RAN telecommunications network.

As used herein, the term "UE" may be one of various types of end-user devices, such as a cellular phone, a smartphone, a cellular modem, a cellular-enabled computerized device, a sensor device, robotic equipment, a vehicle, an Internet of Things (IoT) device, a gaming device, an access point (AP), a two-way radio, a walkie-talkie, or any computerized device capable of communicating via a cellular network. More generally, the UEs 110 can represent any type of device that has an incorporated 5G interface, such as, e.g., a 5G modem. Examples can include a sensor device, an IoT device, a manufacturing robot, an unmanned aerial (or land-based) vehicle, a network-connected vehicle, etc. Depending on the location of individual UEs 110, the UEs 110 may use radio frequency (RF) to communicate with various base stations of a telecommunications network (e.g., the wireless access point 115 of the telecommunications network 100 of FIG. 1). While FIG. 1 illustrates three UEs 110 connected to the wireless access point 115, in practical implementations any number of UEs 110 may be connected to the wireless access point 115 at any given time.

The wireless access point 115 may represent the physical infrastructure (e.g., a 5G tower or base station) to which the UE(s) 110 connects. The wireless access point 115 may be any structure to which one or more antennas are mounted. The wireless access point 115 may be a dedicated cellular tower, a building, a water tower, or any other man-made or natural structure to which one or more antennas can reasonably be mounted to provide cellular coverage to a geographic area.

The wireless access point 115 may include the RU(s) 131. The RU(s) 131 are configured to convert radio signals sent to and received from the antenna(s) into a digital signal. The wireless access point 115 is connected to the RAN components 130 via a fronthaul link over which the digital signals may be communicated. The DU(s) 132 may be connected to the CU(s) 133 via a midhaul link. The CU(s) 133 may be connected to the 5GC 135 via a backhaul link. While FIG. 1 illustrates a single wireless access point 115, in practical implementations the telecommunications network 100 may include any number of wireless access points 115.

In one example, the telecommunications network 100 may be configured according to a region-based network topology. For example, the telecommunications network 100 may be implemented using a cloud computing platform that is logically and physically divided up into various different cloud computing regions (e.g., AWS regions). The cloud computing regions may be based on the geographical location of the gNBs; for example, the telecommunications network 100 for a given nation may be divided into a number of geographical regions. Each of the cloud computing regions can be isolated from other cloud computing regions to help provide fault tolerance, fail-over, load-balancing, and/or stability and each of the cloud computing regions can be composed of multiple availability zones or markets, each of which can be a separate data center located in general proximity to each other (e.g., within 100 miles). For example, one cloud computing region may have its datacenters and hardware located in the northeast of the United States while another cloud computing region may have its data centers and hardware located in California.

Each of the availability zones may be a discrete data center or group of data centers that allows for redundancy, thereby to provide fail-over protection from other availability zones within the same cloud computing region. For example, when a particular data center of an availability zone experiences an outage, another data center of the availability zone or separate availability zone within the same cloud computing region can continue functioning and providing service. An availability zone may be divided into multiple local zones or areas-of-interest (AOIs). For instance, a client, such as a provider of the telecommunications network 100, can select from more options of the computing resources that can be reserved at an availability zone compared to a local zone. However, a local zone may provide computing resources nearby geographic locations where an availability zone is not available. Each local zone may be divided into multiple gNBs, each of which can serve one or more sites. A site may have one DU 132 and a number of RUs 131 (e.g., six RUs 131) assigned to it.

The 5GC 140 provides a plurality of 5G core functions. In the topology of a 5G NR cellular network, 5G core functions of 5GC 140 can logically reside as part of a national data center (NDC). An NDC can be understood as having its functionality existing in a cloud computing region across multiple availability zones. This arrangement allows for load-balancing, redundancy, and fail-over. In local zones, multiple regional data centers can be logically present. Each of regional data centers may execute 5G core functions for a different geographic region or group of RAN components. An example of 5G core components that can be executed within a regional data center (RDC) are described in more detail with regard to FIG. 2. The data network 145 may be the Internet, an enterprise data network, combinations thereof, or the like.

Figure 2:
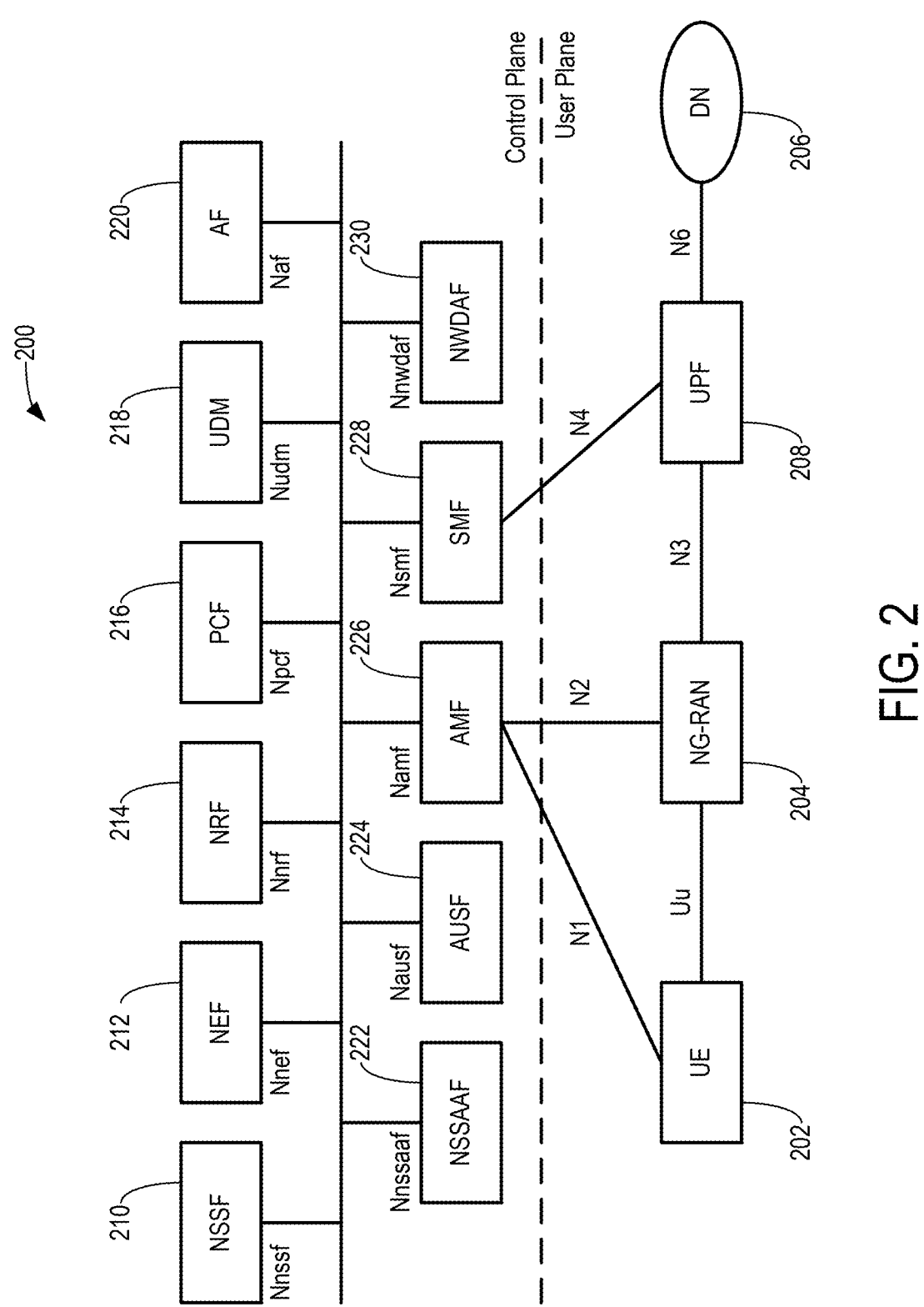
FIG. 2 illustrates an example of a service-based architecture for a telecommunications network in accordance with various aspects of the present disclosure.

FIG. 2 illustrates an example architecture 200 for a telecommunications network (e.g., the telecommunications network 100 of FIG. 1) in accordance with various aspects of the present disclosure. In some instances, the architecture 200 may be a service-based architecture (SBA), such as, e.g., a SBA based on HTTP2. The architecture 200 may be divided between a control plane (CP) and a user plane (UP). The CP may include a plurality of CP network functions (NFs). The UP may include a UE 202 (e.g., one of the UEs 110 of FIG. 1) connected to an NG-RAN 204, and UP NFs (e.g., a User Plane Function (UPF) 208). In some implementations, using the architecture 200, the UE 202 may access a data network 206 (e.g., the data network 140 of FIG. 1). For ease of illustration, FIG. 2 only shows a single UE 202 being connected to the NG-RAN 204; however, in practical implementations, any number of UEs 202 may be present, limited only by the capacity of the network. Any of the NFs illustrated in FIG. 2 and/or described herein may be implemented as a software unit residing on a server (i.e., in the cloud).

The UP NFs may include a User Plane Function (UPF) 208. The UPF 208 is a NF that routes and forwards UP data packets between the base station (cell site; for example, the NG-RAN 204) and the data network 206 (e.g., the Internet). The UPF 208 may be similar to the service and packet gateway functions in a 4G network, but the UPF 208 is cloud-native and can be deployed anywhere to meet service requirements. The UPF 208 can also manage, prioritize, and duplicate data packets as those data packets traverse the network, thus offering redundancy and quality-of-service (QoS) assurance.

The CP NFs may include a Network Slice Selection Function (NSSF) 210, a Network Exposure Function (NEF) 212, a Network Repository Function (NRF) 214, a Policy Control Function (PCF) 216, a Unified Data Management (UDM) 218, an Application Function (AF) 220, a Network Slice-specific and SNPN Authentication and Authorization Function (NSSAAF) 222, an Authentication Server Function (AUSF) 224, an Access and Mobility Management Function (AMF) 226, a Session Management Function (SMF) 228, and a Network Data Analytics Function (NWDAF) 230.

The NSSF 210 may be a CP function that provides network slices to the AMF 226. A network slice is an independent, end-to-end logical network that runs on shared physical network infrastructure. The network slice involves the allocation of network resources across all network infrastructure to meet specific service requirements, from the network core to the RAN. Specific requirements may include QoS assurance, security policies, data isolation, dynamic policy management, etc.

The NEF 212 may be a CP function that provides information regarding the NFs that are available to use (by the enterprise customer). The NEF 212 may be similar to the 4G Service Capabilities Exposure Function (SCEF), but the NEF 212 is cloud-native and exposes event information, network monitoring, network control, provisioning capabilities, and policy/charging capabilities externally. This allows the enterprise customer to monitor and affect QoS and charging for devices.

The NRF 214 may be a CP function that allows 5G NFs to be registered, discovered, and subsequently made available to customers. This is a unique capability in the SA 5G network that allows customers to subscribe to the necessary microservices or to have dedicated NFs for their services.

The PCF 216 may be a CP function that provides policies for mobility and session management. The PCF 216 may be similar to the Policy and Charging Rules Function (PCRF) in a 4G network, but the PCF 216 is cloud-native and offers additional capabilities in the 5G network, including event-based policy triggers, resource reservation requests, and access network discovery and selection. The PCF 216 may directly influence QoS and subscriber spending limits, and, as a result, may play a role in the enhanced policy management and control capabilities of the 5G network.

The UDM 218 may be a CP function that manages and stores subscriber and device information, default QoS and prioritization, authorized data channels, maximum bit rates, service continuity provisions, and the like. The UDM 218 may be similar to the Home Subscriber Server (HSS) function in a 5G network, but the UDM 218 is cloud-native and designed for 5G services.

The AF 220 may be a CP function that interacts with the 3GPP Core Network in order to provide services, for example, to support one or more of application function influence on traffic routing, application function influence on service function chaining, accessing the NEF 212, interacting with the PCF 216, time synchronization service, IP multimedia subsystem (IMS) interactions with the 5GC, or packet data unit (PDU) set handling.

The NSSAAF 222 may be a CP function that supports authentication and authorization of slicing with an AAA server (Authentication, Authorization, and Accounting). The NSSAAF 222 may be a unique capability of the SA 5G network that allows customers to access a predefined network slice or a newly requested network slice in real-time (or near real-time) and using their own existing authentication infrastructure.

The AUSF 224 may be a CP function that supports authentication for 3GPP access and untrusted non-3GPP access, and authentication of a UE for a disaster roaming service. The AUSF 224 can act as an authentication server.

The AMF 226 may be a CP function that manages registration, authorization, connection, reachability, and mobility. The AMF 226 may be similar to the Mobility Management Entity (MME) function in a 4G network, but the AMF 226 is cloud-native and supports many additional capabilities unique to 5G. For example, the AMF 226 may also support dynamic updating of network interfaces and cellular sites, greater privacy via the use of a 5G temporary device identity, enhanced security across the user and control planes, and storing of network slice information. The AMF 226 can also select an appropriate PCF for a device or use case.

The SMF 228 may be a CP function that oversees packet data session management, IP address allocation, data tunneling from a cell site base station to the UP function, and downlink notification management. The SMF 228 may perform the tasks of the serving and packet gateways (S-GW & P-GW) in a 4G network, but also allows for CP and UP separation in 5G.

The NWDAF 230 may be a CP function that collects data from pertinent network infrastructure relevant to a customer's services, including UE (device), NFs, network operations and administration, cloud, and edge that can be used for data analytics and insights. The NWDAF 230 may be a unique SA 5G NF that exposes full visibility to network performance and operations as they relate to a customer's key performance indicators (KPIs).

The SBA 200 may further include a plurality of service-based interfaces to provide access to or communication with the various NFs. As illustrated, such service-based interfaces may include an Nnssf interface for the NSSF 210, an Nnef interface for the NEF 212, an Nnrf interface for the NRF 214, an Npcf interface for the PCF 216, an Nudm interface for the UDM 218, an Naf interface for the AF 220, an Nnssaaf interface for the NSSAAF 222, an Nausf interface for the AUSF 224, an Namf interface for the AMF 226, an Nsmf interface for the SMF 228, and an Nnwdaf interface for the NWDAF 230. FIG. 1 also illustrates several reference points (i.e., interfaces between two NFs or entities), including an N1 interface between the UE 202 and the AMF 226, a Uu interface between the UE 202 and the NG-RAN 204, an N2 interface between the NG-RAN 204 and the AMF 226, an N3 interface between the NG-RAN 204 and the UPF 208, an N4 interface between the UPF 208 and the SMF 228, and an N6 interface between the UPF 208 and the data network 206.

The above-listed NFs and interfaces are intended to be illustrative and not exhaustive. In practical implementations, the SBA 200 may include additional NFs or other network entities, such as an Unstructured Data Storage Function (UDSF), a Network Slice Admission Control Function (NSCAF), a Unified Data Repository (UDR), a UE radio Capability Management Function (UCMF), a 5G-Equipment Identity Register (5G-EIR), a Charging Function (CHF), a Time Sensitive Networking AF (TSN AF), a Time Sensitive Communication and Time Synchronization Function (TSCTSF), a Data Collection Coordination Function (DCCF), an Analytics Data Repository Function (ADRF), a Messaging Framework Adaptor Function (MFAF), a Non-Seamless WLAN Offload Function (NSWOF), an Edge Application Server Discovery Function (EASDF), a Service Communication Proxy (SCP), a Security Edge Protection Proxy (SEPP), a Non-3GPP InterWorking Function (N3IWF), a Trusted Non-3GPP Gateway Function (TNGF), a Wireline Access Gateway Function (W-AGF), or a Trusted WLAN Interworking Function (TWIF).

For purposes of explanation, the technology disclosed herein will be described as being implemented in a 5G O-RAN network; however, in practice, the technology disclosed herein may be implemented with any RAN architecture (including, e.g., any virtualized RAN architecture). Moreover, for purposes of explanation, the systems and methods described herein will be described as being implemented in a network operating using AWS; however, these are merely examples and not limiting. The systems and methods of the present disclosure may be implemented with other web services provider and with other container organization architectures. The methods described herein may be performed by a processing system including at least one electronic processor, where the at least one electronic processor may be or include a processor as described herein (e.g., including one or more individual electronic processors). A data center server is an example of such a processing system that may perform the methods described herein.

As described herein with respect to FIG. 1, the 5GC 140 provides a plurality of 5G core functions, which may reside and/or execute via one or more data centers (e.g., one or more NDCs or RDCs), including, e.g., one or more data center servers. For instance, in some configurations, the data center server(s) may store and execute a set of instructions for executing one or more NF as described herein. Additionally, in some embodiments, the data center server may be a local server located at corresponding cell site(s) (e.g., as part of an on-site computing platform of a corresponding wireless access point 115 or cell site). Alternatively, or in addition, in some embodiments, the data center server may be a remote cloud server located remotely from the corresponding cell site(s).

For example, FIG. 3 schematically illustrates an example server 300 (e.g., a data center server for the 5GC 140 of FIG. 1) according to some configurations. As illustrated in FIG. 3, the server 300 includes a server electronic processor 305, a server memory 310, and a server communication interface 315. The server electronic processor 305, the server memory 310, and the server communication interface 315 may communicate wirelessly, over one or more communication lines or buses, or a combination thereof. The server 300 may include additional, different, or fewer components than those illustrated in FIG. 3 in various configurations. The server 300 may perform additional or different functionality than the functionality described herein. Also, the functionality (or a portion thereof) described herein as being performed by the server 300 may be performed by another component (e.g., another data center server or component of the 5GC 140), distributed among multiple devices (e.g., as part of a cloud service or cloud-computing environment), combined with another component (e.g., another component of the telecommunications network 100), or a combination thereof.

Figure 3:
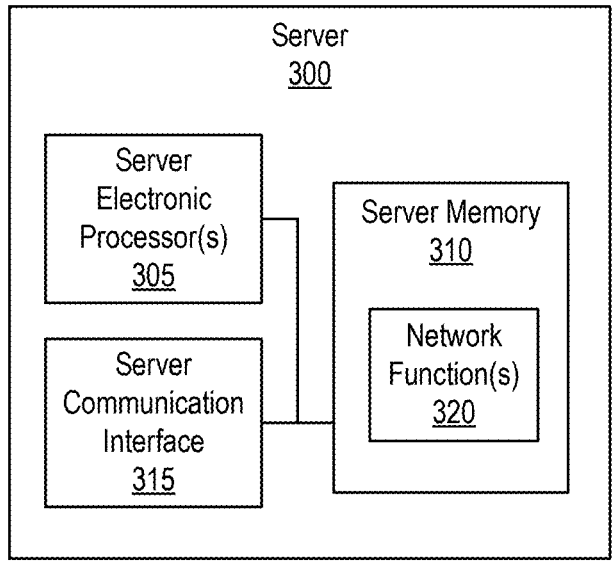
FIG. 3 schematically illustrates an example of a server in accordance with various aspects of the present disclosure.

The server communication interface 315 may include a transceiver that communicates with other components of the telecommunications network 100, such as, e.g., the data network 145, the RAN 130, including, e.g., the RU(s) 131, DU(s) 132, or CU(s) 133, etc. over one or more communication networks or connections. The server electronic processor 305 includes one or more electronic processors (e.g., one or more microprocessors, one or more application-specific integrated circuits (ASICs), and/or one or more other suitable electronic device for processing data), and the server memory 310 includes a non-transitory, computer-readable storage medium. The server electronic processor 305 is configured to retrieve instructions and data from the server memory 310 and execute the instructions. For example, as illustrated in FIG. 3, the server memory 310 may store one or more network functions 320 (also referred to herein as the NFs 320). The NFs 320 may include, e.g., one or more of the network functions described herein, such as, e.g., with respect to FIG. 2.

Figure 4:
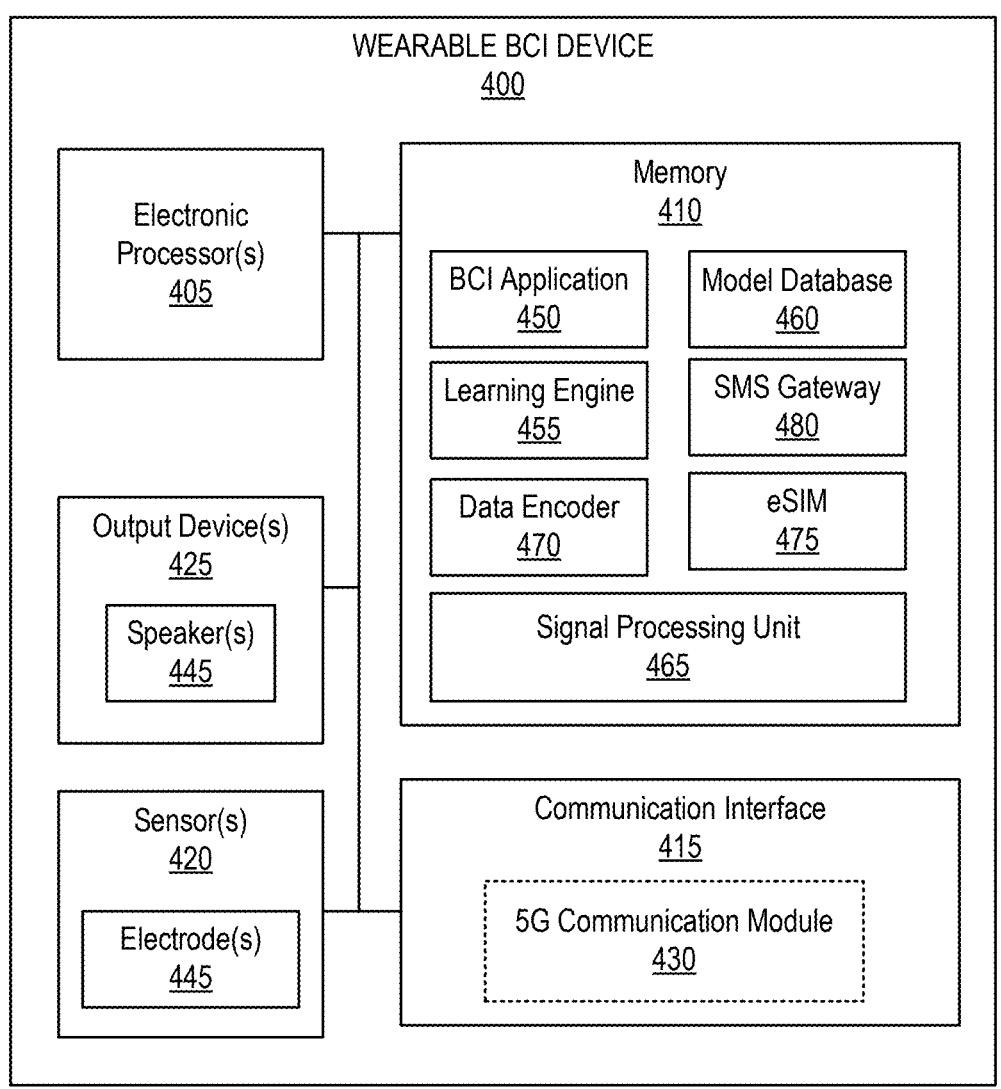
FIG. 4 schematically illustrates an example of wearable BCI device in accordance with various aspects of the present disclosure.

FIG. 4 schematically illustrates an example wearable BCI device 400 (also referred to herein as "the BCI device 400") according to some configurations. In some instances, the BCI device 400 may be an example of a UE (e.g., the UE 110). In some configurations, the BCI device 400 is a non-invasive BCI device, such as, e.g., a wearable EEG headset.

As illustrated in FIG. 4, the BCI device 400 includes an electronic processor 405, a memory 410, a communication interface 415, one or more sensor(s) 420, and one or more output device(s) 425. The electronic processor 405, the memory 410, the communication interface 415, the sensor(s) 420, and the output device(s) 425 may communicate wirelessly, over one or more communication lines or buses, or a combination thereof. The BCI device 400 may include additional, different, or fewer components than those illustrated in FIG. 4 in various configurations. The BCI device 400 may perform additional or different functionality than the functionality described herein. Also, the functionality (or a portion thereof) described herein as being performed by the BCI device 400 may be performed by another component or device (e.g., the server 300, another component of the 5GC 140, or the like), distributed among multiple devices (e.g., as part of a cloud service or cloud-computing environment, such as the server 300, another component of the 5GC 140, etc.), combined with another component (e.g., another component of the telecommunications network 100), or a combination thereof.

The communication interface 415 may include a transceiver that communicates with other components of the telecommunications network 100, such as, e.g., the data network 145, the RAN 130, including, e.g., the RU(s) 131, DU(s) 132, or CU(s) 133, etc. over one or more communication networks or connections.

As illustrated in FIG. 4, in some configurations, the communication interface 415 may be (or otherwise include) a 5G communication module 430. In some examples, the 5G communication module 430 may be a 5G NR communication module. In some configurations, the 5G communication model 430 may facilitate transmission of communications using a 5G signal (e.g., a 5G NR signal). As described herein, in some instances, the communications may include short message service (SMS) messages or transmissions. As such, in some instances, the 5G communication module 430 may facilitate the transmission of SMS messages using the 5G NR signal. In some examples, the 5G communication module 430 may ensure that such SMS messages are transmitted with low-latency and high-reliability. As such, in some instances, the technology disclosed herein may advantageously leverage the performance and capabilities of the speed and coverage of 5G.

The electronic processor 405 includes one or more processors (e.g., one or more microprocessors, one or more ASICs, or one or more other suitable electronic device for processing data), and the memory 410 includes a non-transitory, computer-readable storage medium. The electronic processor 405 is configured to retrieve instructions and data from the memory 410 and execute the instructions. For example, each respective component of the memory 410 illustrated in FIG. 4 (e.g., each of a BCI application 450, learning engine 455, model database 460, signal processing unit 465, data encoder 470, eSIM 475, and SMS gateway 480) may include respective collections of instructions and data that, when retrieved and/or executed by the electronic processor 405, enable the electronic processor 405 (and, thus, the wearable BCI device 400) to carry out the functionality of the respective component described herein.

For example, as illustrated in FIG. 4, the memory 410 may store a BCI application 450. The BCI application 450 is a software application executable by the electronic processor 405 in the example illustrated and as specifically discussed below, although a similarly purposed module can be implemented in other ways in other examples. In some configurations, the BCI application 450 may be a dedicated software application locally stored in the memory 410 of the BCI device 400. As described in greater detail herein, the BCI application 450 (when executed by the electronic processor 405) may enable or facilitate functionality (e.g., controlling the capture and interpretation of electrical signals, the transmission of data or SMS messages, etc.) in accordance with the technology disclosed herein.

As illustrated in FIG. 4, in some configurations, the memory 305 may also include a learning engine 455 and a models database 460. In some configurations, the learning engine 455 develops a model using an artificial intelligence (AI) or machine learning function. Machine learning functions are generally functions that allow a computer application to learn without being explicitly programmed. In particular, the learning engine 455 is configured to develop a model based on training data. As one example, to perform supervised learning, the training data includes example inputs and corresponding desired (for example, actual) outputs, and the learning engine 455 progressively develops a model that maps inputs to the outputs included in the training data. As another example, to perform self-supervised learning ("SSL"), a model is trained on a task using the data itself to generate supervisory signals (e.g., unlabeled training data), rather than relying on, e.g., external labels provided by a user (e.g., labeled training data). As yet another example, to perform semi-supervised learning, the training data may include desired output values for a subset of the training data (e.g., labeled training data) while the remaining training data may be unlabeled or imprecisely labeled (e.g., unlabeled training data). Machine learning performed by the learning engine 455 may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 455 to ingest, parse, and understand data and progressively refine models.

As described in greater detail herein, in some configurations, the technology disclosed herein may utilize or implement deep learning (e.g., one or more models) as part of implementing the BCI system (or device) disclosed herein, such as, e.g., a machine learning model configured to extract (or identify) a pattern of an electrical signal, determine an intent (or command) corresponding to the electrical signal based on the pattern, etc. An intent corresponding to (or of) an electrical signal may represent a thought or command of the neurological activity (e.g., an objective or intention behind a thought or command). As one example, when an electrical signal is related to a thought regarding zooming in with respect to an electronic file being viewed by a user, the intent of the electrical signal may be to zoom in on the electronic file.

As such, in some instances, an input of a machine learning model may include an electrical signal (or a preprocessed electrical signal, as described in greater detail herein) and an output of the machine learning model may be intent data (e.g., data related to an intent of the electrical signal), such as, e.g., a thought, a command, etc. In some configurations, an output of the machine learning model may relate to communicating with a recipient (e.g., a recipient UE). As one example, the electrical signal may have an intent related to sending a specific communication (e.g., "Do you want to come over to study?") to a specific recipient (or recipient UE) (e.g., Jane Doe at 123-123-1234). Following this example, when that electrical signal is input into the machine learning model (e.g., the machine learning model is applied to that electrical signal), the machine learning model may output intent data that may include, e.g., an intent type (e.g., transmit communication), a content of the communication (e.g., "Do you want to come over to study?"), an identifier of the recipient (or recipient UE) (e.g., a name, a phone number, etc.), etc.

For example, in some instances, the learning engine 455, the model database 460 (or the model(s) thereof), or a combination thereof may be implemented as a deep learning interpretation module (or component). In some configurations, the deep learning interpretation module may enhance the ability to understand and classify brainwave patterns (e.g., including the identification or extraction of such patterns from electrical signals collected via the sensor(s) 420). In some cases, the technology disclosed herein, may implement a neural network trained on a dataset of brain electrical signals (e.g., the model(s) developed using the learning engine 455). In such instances, the deep learning interpretation module (e.g., via application or execution of the model(s) of the model database 460) may identify (or extract) patterns that correspond to specific thoughts or commands of a user of the BCI device 400 (also referred to herein as an intent of the electrical signal). The deep learning model may (continuously) improve over time by learning from new data to increase its accuracy (e.g., the learning engine 455 may re-train or update the model(s) of the model database 460 based on training data, such as, e.g., newly available or generated training data). Accordingly, in some instances, the deep learning interpretation module (e.g., the learning engine 455, the model database 460 (or the model(s) thereof), or a combination thereof may provide a layer of intelligence to the BCI system (e.g., the BCI device 400), allowing more sophisticated and accurate interpretations of neurological activity (e.g., brain electrical signals).

In some instances, a model described herein may be trained or developed using training data specific to a particular user such that the model is custom (or tailored) for that particular user. For example, an electrical signal having a particular set of properties may correspond to different intents depending on the user. For example, a specific property of an electrical signal may correspond to a first intent for a first user while that specific property of the electrical signal may correspond to a different intent for a second user. Alternatively, or in addition, in some configurations, a model described herein may be trained or developed using training data related to multiple users (e.g., feedback data collected from multiple users of BCI systems or devices). For example, interpretation of an electrical signal (or properties thereof) may be based on a user of the BCI device 400 in addition to other users.

The model(s) generated by the learning engine 455 can be stored in the model database 460. As illustrated in FIG. 4, the model database 460 is included in the memory 410 of the BCI device 400. It should be understood, however, that, in some configurations, the model database 455 may be included in a different component of the BCI device 400, a separate device accessible by the BCI device 400 (e.g., a remote database, the server 300, another component of the 5GC 140, or the like), etc.

For instance, in some configurations, the server 300 may store the learning engine 455, the model database 460 (or model(s) thereof), or a combination thereof. For example, in some configurations, the server 300 may be a central cloud server that stores a remote cloud model database (e.g., the model database 460 storing a plurality of remote cloud models). The server 300 may receive data relating to how other users interact with other BCI devices. The server 300 may utilize such data as training data for the remote cloud model(s) such that, e.g., the remote cloud model(s) may be continuously improved. As the remote cloud model(s) improve, such improvements may be passed on to the machine learning models in the model database 460 of the BCI device 400 (e.g., local versions of the machine learning model(s)). For instance, when a weighting changes for a remote cloud model, a local version of that model stored at the BCI device 400 may be updated based on the changed weighting. Accordingly, as noted herein, in some configurations, the learning engine 455 may develop model(s) (e.g., the model(s) of the model database 460) based on training data associated with various sources (e.g., various BCI devices 400, users, etc.). Alternatively, or in addition, as also noted herein, in some instances, the learning engine 455 may develop model(s) (e.g., the model(s) of the model database 460) based on training data associated with the BCI device 400 or a user wearing the BCI device 400. In such instances, the model(s) may be custom or tailored to a user of the BCI device 400.

As illustrated in FIG. 4, the memory 410 may also include a signal processing unit 465. The signal processing unit 465 may facilitate initial processing (or preprocessing) of electrical signals (e.g., as collected by the sensor(s) 420). As described in greater detail herein, in some instances, the signal processing unit 465 may preprocess raw electrical signals. In some configurations, the signal processing unit 465 may apply a filter (or filtering techniques) to the electrical signals in order to, e.g., remove noise or artifacts, amplify the electrical signals, or otherwise clean or enhance the electrical signal(s). As such, in some examples, the signal processing unit 465 may generate (or otherwise output) a preprocessed electrical signal based on the electrical signal(s) collected via the sensor(s) 420, as described in greater detail herein.

As illustrated in FIG. 4, the memory 410 may also include a data encoder 470. The data encoder 470 may transform (or translate) interpreted brain electrical signals (e.g., intent data) to a format (e.g., a digital format) for transmission thereof (e.g., into a format that is compatible to be transmitted, such as, e.g., as an SMS message), as described in greater detail herein. In some instances, the data encoder 470 may encode the interpreted brain electrical signals into a compact, efficient format that can be easily transmitted over mobile networks (e.g., the 5GC 140, the telecommunications network 100, including, e.g., a 5G NR telecommunications network, etc.). By optimizing the size and structure of the data, the data encoder 470 may ensure that the information can be transmitted quickly and accurately (e.g., via SMS). As such, in some examples, the data encoder 470 may generate (or otherwise output) encoded data based on the interpreted brain electrical signals (e.g., intent data), as described in greater detail herein.

As illustrated in FIG. 4, the memory 410 may also include an embedded subscriber identity module (eSIM) 475. The eSIM 475 may allow the BCI system (e.g., the BCI device 400) to be connected (communicatively coupled) to a mobile network (e.g., the 5GC 140, the telecommunications network 100, another component of the telecommunications network 100, etc.). By connecting the BCI device 400 to the mobile network, the BCI device 400 may transmit communications (e.g., the encoded data generated by the data encoder 470, including, e.g., SMS messages) using, e.g., 5G NR technology. The eSIM 475 may be directly embedded into the BCI system (e.g., the BCI device 400), thus providing seamless connectivity without a physical SIM card. As such, the eSIM 475 may provide flexibility and reliability, ensuring that the technology disclosed herein can operate effectively in various environments with network coverage (e.g., 5G coverage).

As illustrated in FIG. 4, the memory 410 may also include a short message service (SMS) gateway 480. The SMS gateway 480 may facilitate the transmission of communications (e.g., the encoded data generated by the data encoder 470, including, e.g., SMS messages) to ensure that the communications (e.g., SMS message) is transmitted to an intended recipient (or intended recipient UE). For instance, in some configurations, the SMS gateway 480 may connect the 5G NR signal to a broader mobile network infrastructure, delivering the SMS message to any mobile device (e.g., any UE 100). As such the SMS gateway 480 may facilitate communication between the BCI system (e.g., the BCI device 400) and standard mobile devices (e.g., the UE(s) 110), which provides high versatility and wide applicability for the technology disclosed herein.

The memory 410 may include additional, different, or fewer components in different configurations than illustrated in FIG. 4. Alternatively, or in addition, in some configurations, one or more components of the memory 410 may be combined into a single component, distributed among multiple components, or the like. Alternatively, or in addition, in some configurations, one or more components of the memory 410 may be stored remotely from the BCI device 400, or, in a remote database, another server (e.g., the server 300 of the 5GC 140), a remote user device, an external storage device, or the like.

As illustrated in FIG. 4, the BCI device 400 may include at least one output device 425. The output device 425 may provide an output (e.g., data or information) to a user of the wearable BCI device 400. The output device 425 may provide various types of output, such as, e.g., an audible output, a tactile (or haptic) output, a visual output, etc. For example, in some instances, the output device 425 may be a speaker 445 configured to output (or otherwise provide) an audible output or signal (e.g., output a tone, a voice recording, etc.). Alternatively, or in addition, in some instances, the output device 425 may provide a tactile (or haptic) output such as, e.g., a vibration. Alternatively, or in addition, in some instances, the output device 425 may provide a visual output, such as, e.g., illuminating a light (e.g., an LED). As described in greater detail herein, in some instances, the technology disclosed herein may utilize the output device(s) 425 (e.g., the speaker(s) 445) to provide status information to a user of the BCI device 400, such as, e.g., a confirmation that a communication was transmitted to a recipient UE, a confirmation that the communication was successfully delivered to the recipient UE, etc.

The BCI device 400 may include at least one sensor 420. The sensor(s) 420 may facilitate the capture of neurological activity of a user wearing the BCI device 400. For example, the sensor(s) 420 may be configured to monitor (or detect) electrical signals related to neurological activity (either non-invasively or invasively). As one example, the sensor(s) 420 may include one or more electrode(s) 445. In some configurations, the electrode(s) 445 may include an electro-encephalogram (EEG) electrode. An EEG electrode may be a surface electrode (e.g., for non-invasive applications) or a needle electrode (e.g., for invasive applications). Accordingly, in some instances, the sensor(s) 420 may monitor (or detect) electrical signals non-invasively. For example, in some configurations, the sensor(s) 420 (e.g., the electrode(s) 445) may be positioned on a head (or scalp) of a user such that the sensor(s) 420 at least partially make contact with a surface of the head (or scalp) of the user. Alternatively, or in addition, in some configurations, the sensor(s) 420 may monitor (or detect) electrical signals invasively. In such configurations, the sensor(s) 420 (e.g., the electrode(s) 445) may be invasively positioned within a user of the BCI device 400.

As noted, in some configurations, the BCI device 400 is a non-invasive BCI device, such as, e.g., a wearable EEG headset. In the form of a wearable EEG headset, the BCI device 400 may include a fabric cap formed to fit on a human head (e.g., like a hat) wherein sensors (e.g., sensor(s) 420) are embedded and/or retained by the fabric cap in particular locations to sense EEG signals. Such a wearable EEG headset may further include a pocket and/or other retention features to support and retain the other components of the BCI device 400 (e.g., the electronic processor(s) 405, the memory 410, the output device(s) 425, and/or the communication interface 415. Although not illustrated in FIG. 4, the wearable BCI device 400 may further include or be connected to a power supply (e.g., a battery) to power the components thereof.

FIG. 5 is a flowchart illustrating an example method 500 to implement a brain-computer interface (BCI) system with deep learning for transmitting communications via a telecommunications network (e.g., the telecommunications network 100 of FIG. 1) in accordance with some configurations. The method 500 is described as being performed by the BCI device 400 and, in particular, the electronic processor(s) 405. However, as noted above, the functionality (or a portion thereof) described with respect to the method 500 may be performed by other devices, such as, e.g., another server or device within the telecommunications network 100 (e.g., the server 300 of the 5GC 140), or distributed among a plurality of devices, such as a plurality of servers included in a cloud service. Thus, although described as begin performed by the BCI device 400, the method 500 may also be described as being performed by a processing system including one or more electronic processors (e.g., another processor or processors of the telecommunication network 100).

As illustrated in FIG. 5, the electronic processor 405 may receive an electrical signal (at block 505). As described herein, the electrical signal may relate to (or otherwise describe) neurological activity of a user wearing the BCI device 400. As also described herein, the sensor(s) 420 (e.g., the electrode(s) 445) may collect (or detect) the electrical signal. As such, in some instances, the electronic processor 405 may receive the electrical signal from the sensor(s) 420, such as, e.g., the electrode(s) 445. In some configurations, the electronic processor 405 may receive the electrical signal in real-time (or near real-time) (e.g., as the sensor(s) 420 monitor the neurological activity of the user wearing the BCI device 400).

The electronic processor 405 apply a filter to the electrical signal (or otherwise preprocess the electrical signal) (at block 510). In some examples, the electronic processor 405 may apply the filter to the electrical signal to generate a preprocessed electrical signal. In some configurations, the electronic processor 405 may invoke (or otherwise execute) the signal processing unit 465 in order to apply a filter to (or otherwise preprocess) the electrical signal. In some examples, the electronic processor 405 may apply a filter (or otherwise filter or preprocess) the electrical signal in order to prepare the electrical signal for interpretation (e.g., analysis using the model(s) described herein). Accordingly, in some configurations, the electronic processor 405 may applies filtering techniques to remove noise and artifacts, leaving behind the most relevant brainwave patterns so that the preprocessed data (e.g., the preprocessed electrical signal) may be prepared for further interpretation, as described in greater detail herein. As one example, the electronic processor 405 may apply a band-pass filter to the electrical signal to isolate brain activity. As another example, the electronic processor 405 may remove artifacts (e.g., remove electrical activity or signals related to head or eye movements, which are unrelated to the neurological activity of the user). As such, in some examples, the electronic processor 405 may enhance the signal-to-noise ratio with respect to the electrical signal. As yet another example, the electronic processor 405 may perform signal normalization functions (e.g., applying gain, shifting a signal, scaling a signal, etc.).

The electronic processor 405 may provide the (preprocessed) electrical signal to a machine learning model (at block 515) and receive, from the machine learning model, intent data related to an intent of the electrical signal (at block 520). Accordingly, in some instances, the electronic processor 405 may invoke (or otherwise execute) a deep learning interpretation module (e.g., the model(s) of the model database 460). As described in greater detail herein, the machine learning model may be trained or configured to extract (or identify) a pattern from the preprocessed electrical signal and determine, based on the pattern, an intent of the electrical signal (e.g., a thought or command of the user of the BCI device 400). For example, the electrical signal (or preprocessed electrical signal) may be provided to the machine learning model(s) of the model database 460) as an input and the machine learning model(s) of the model database 460 may provide intent data as an output. Such machine learning model(s) may also be referred to as trained model(s) or trained machine learning model(s). As described herein, the intent data may represent (or otherwise indicate) a thought or command of the user with respect to the electrical signal.

As described herein, in some instances, the electronic processor 405 may access the model(s) of the model database 460 from the memory 410. Alternatively, or in addition, the electronic processor 405 may access the model(s) from an external device, such as, e.g., the server 300. Accordingly, in some configurations, the electronic processor 405 may transmit, via, e.g., the communication interface 415, the electrical signal (or preprocessed electrical signal) to a cloud server of the 5G NR telecommunications network (e.g., the server 300 or another component of the 5GC 140 or another component of the telecommunications network 100), such as, e.g., when the machine learning model is stored at the cloud server (e.g., the server 300 or another component of the 5GC 140 or another component of the telecommunications network 100). The electronic processor 405 may then receive, via, e.g., the communication interface 415, from the cloud server of the 5G NR telecommunications network (e.g., the server 300 or another component of the 5GC 140 or another component of the telecommunications network 100), the intent data generated by the machine learning model.

The electronic processor 405 may encode the intent data to generate encoded data (at block 525). In some configurations, the electronic processor 405 may invoke (or otherwise execute) the data encoder 470 in order to encode the intent data (e.g., to generate the encoded data). As described in greater detail herein, the electronic processor 405 may encode the intent data such that the intent data is compatible for transmission via the telecommunications network 100. As one example, the electronic processor 405 may encode the intent data (as encoded data) such that the intent data (or the encoded data) may be compatible for transmission via a SMS as a SMS message. That is, the intent data may be encoded into a format of an SMS-protocol. For example, the intent data may include an alphanumeric character string, array, or other collection of data, and the data encoder 470 may process the intent data to encode the intent data into, for example, 7-bit or 16-bit encoding compatible with the SMS communication protocol.

The electronic processor 405 may transmit the encoded data to a recipient UE (at block 530). The electronic processor 405 may transmit the encoded data using the communication interface 415 to the recipient UE via the telecommunications network 100 (e.g., the 5GC 140 or another component thereof). As described herein, in some instances, the electronic processor 405 may transmit the encoded data as a SMS message or communication. In some examples, the electronic processor 405 identifies the recipient UE to which the encoded data is to be transmitted from the intent data. In some examples, the recipient UE identified from the intent data as a nickname (e.g., Jane Doe), and the electronic processor 405 accesses a lookup table (e.g., digital address book stored in the memory 410) to determine a phone number (and/or other contact information) of the recipient UE. The electronic processor 405 may then use the phone number to transmit the encoded data to the recipient UE (e.g., the phone number may be used as the destination for the transmission).

In some configurations, the electronic processor 405 may connect to (or otherwise establish communication with) the telecommunications network 100 using, e.g., subscriber identity data related to the user of the BCI device 400. For example, in some configurations, the electronic processor

405 may access data (e.g., the subscriber identity data) of the eSIM in order to connect to the telecommunications network 100.

In some configurations, the electronic processor 405 may receive, via the communication interface 415, a notification indicative that the SMS message was transmitted to the recipient UE. In some instances, the notification may be a confirmation signal generated and transmitted via the recipient UE. Responsive to the receipt of the notification, the electronic processor 405 may provide an indication of the notification (e.g., as an alert or output). In some examples, the electronic processor 405 may provide the indication of the notification using, e.g., the output device(s) 425 of the BCI device 400, as described in greater detail herein.

As noted herein, in some instances, the machine learning model(s) of the model database 460 may be updated (or re-trained) such that, after updating (or re-training), the electronic processor 405 may utilize the updated (or re-trained) machine learning model(s) with respect to subsequent electrical signals. For example, in some configurations, the BCI device 400 may store a local version of the machine learning model(s) and may update the local version responsive to receipt of another or different version of the machine learning model (or another machine learning model). In some case, the machine learning model may be updated based on training data related to another wearable BCI device (or data related to interactions between another wearable BCI device and a user of that other wearable BCI device). As another example, in some instances, the electronic processor 405 may receive a second (or different) machine learning model, which may be developed using training data related to at least one additional user wearing another BCI device. Responsive to receipt of the second (or different) machine learning model, the electronic processor may store the second (or different) machine learning model (e.g., such that the second machine learning model replaces or updates) the first machine learning model. Responsive to receipt of a subsequent electrical signal, the electronic processor 405 may utilize the second (or different) machine learning model to determine an intent of the subsequent electrical signal.

Figure 6:
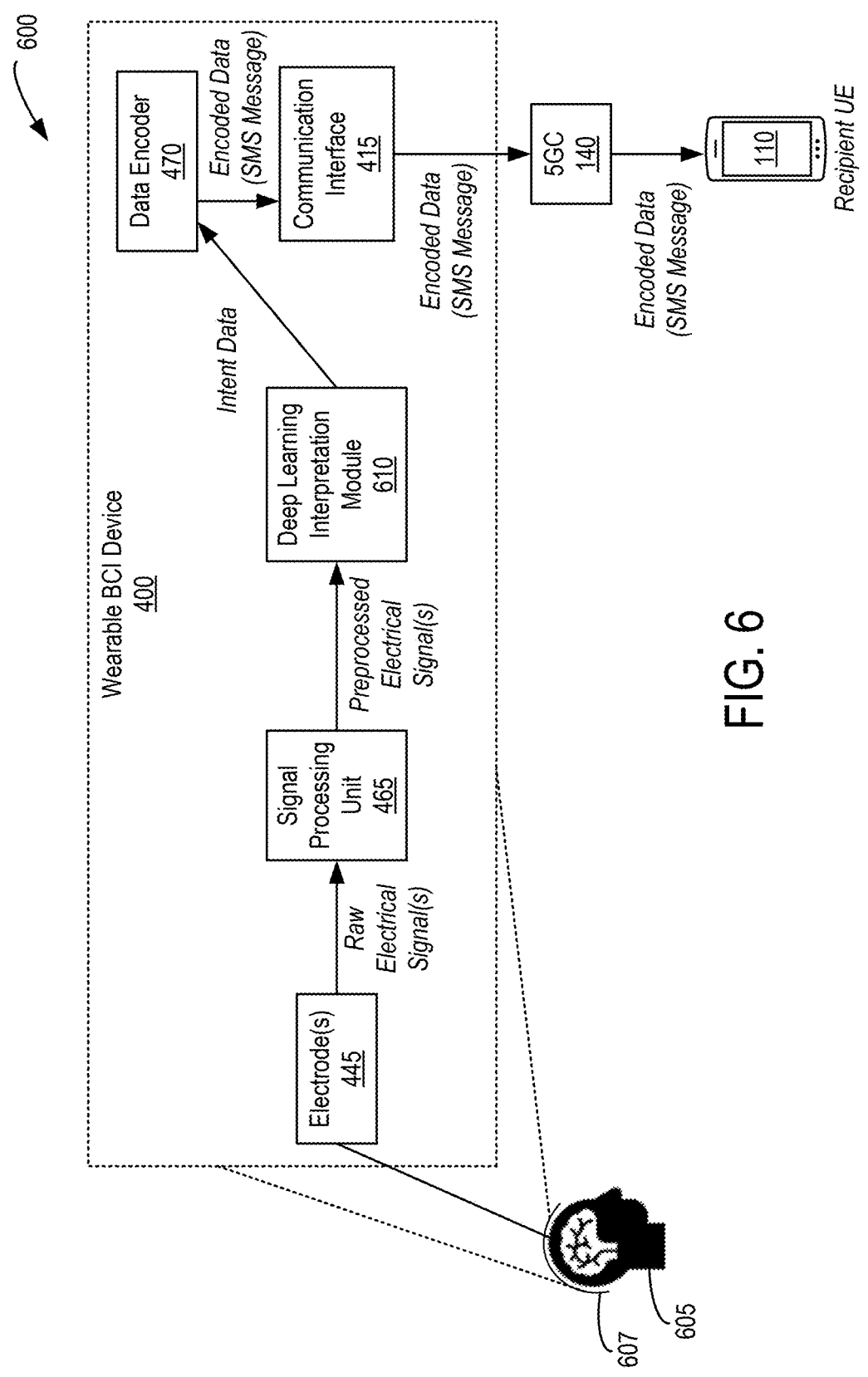
FIG. 6 schematically illustrates an example workflow of a BCI system in accordance with various aspects of the present disclosure.

FIG. 6 illustrates an example workflow 600 of a BCI system in accordance with some configurations. In the example of FIG. 6, the BCI system includes the wearable BCI device 400. The wearable BCI device 400 may interface with a user 605 (e.g., neurological activity of the user 605) using the electrode(s) 445. The wearable BCI device 400 is represented as a curved line over the user 605 (e.g., as a cap 607) and with components thereof shown in a dashed line box. The electrode(s) 445 collect (or monitor) electrical signal(s) related to the neurological activity of the user 605). As illustrated in the example of FIG. 6, the electrode(s) 445 may provide raw electrical signal(s) (e.g., raw EEG signals) to the signal processing unit 465 for preprocessing, as described in greater detail herein. The signal processing unit 465 may provide the preprocessed electrical signal(s) to a deep learning interpretation module 610 (e.g., one or more model(s) of the model database 460). As described in greater detail herein, the deep learning interpretation model 610 may extract (or determine) a pattern of the electrical signal(s) (e.g., the processed electrical signal(s)) and determine an intent based on the pattern. In the illustrated example, the deep learning interpretation model 610 may provide intent data related to the intent of the electrical signal(s) to the data encoder 470. The data encoder 470 may encode the intent data into encoded data (e.g., an SMS message) and provide the encoded data (or SMS message) to the communication interface 415. The communication interface 415 may provide the encoded data (e.g., the SMS message) to the 5GC 140 for transmission to a recipient UE (e.g., the UE 110).

Figure 7:
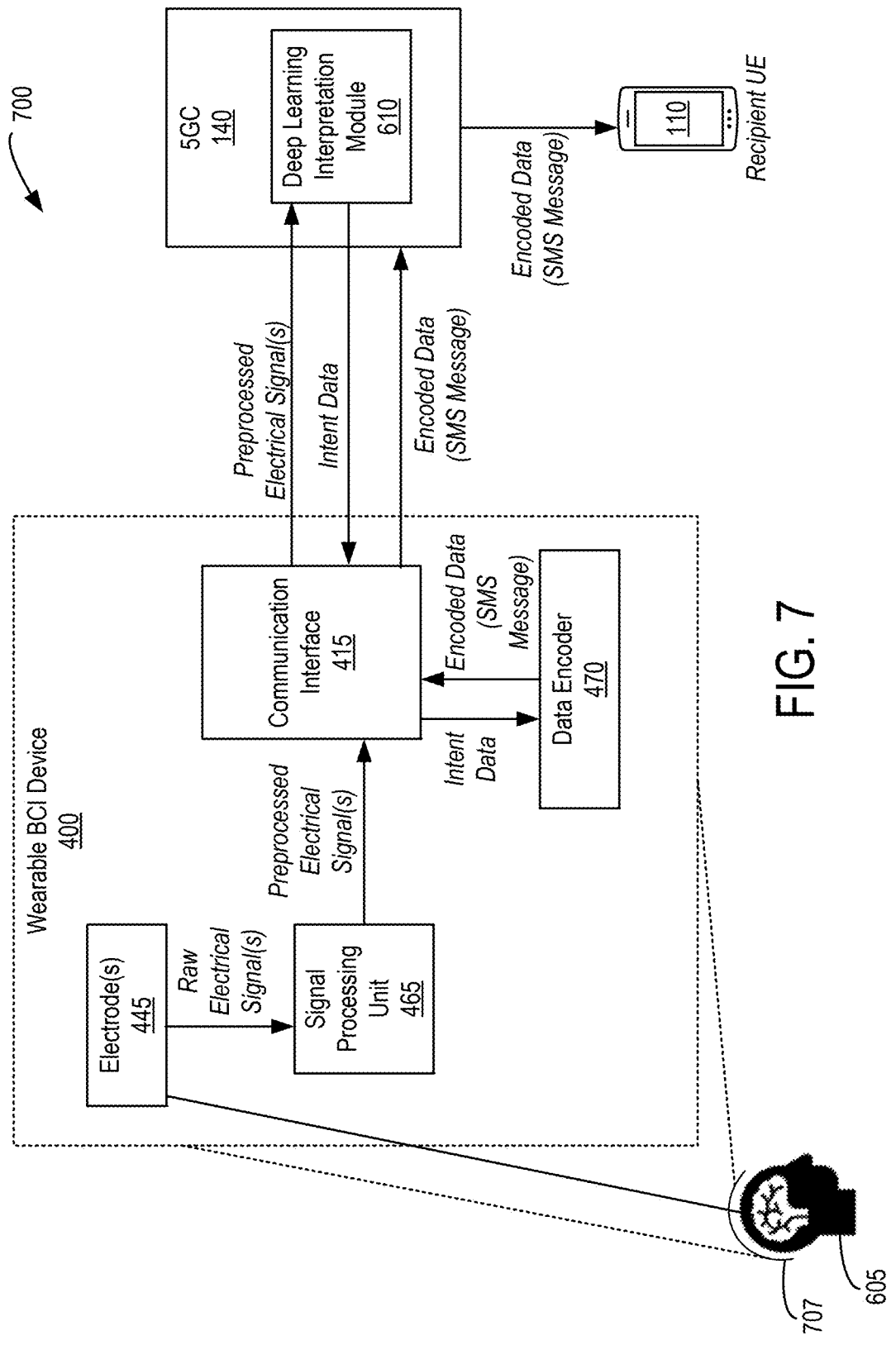
FIG. 7 schematically illustrates another example work-flow of a BCI system in accordance with various aspects of the present disclosure.

FIG. 7 illustrates an example workflow 700 of the BCI system in accordance with some configurations. Here, the wearable BCI device 400 is represented as a curved line over the user 605 (e.g., as a cap 707) and with components thereof shown in a dashed line box. As described in greater detail herein, one or more components described as being implemented at the BCI device 400 may be implemented at another device, such as, e.g., a component of the 5GC 140 (e.g., the server 300 or another component of the 5GC 140). In the example of FIG. 7, the deep learning interpretation module 610 (e.g., the learning engine 455, the model database 460 (or model(s) thereof), etc.) may be implemented at a component of the 5GC 140 (e.g., the server 300). Accordingly, as described herein, in such configurations, the electrical signal(s) (or preprocessed electrical signal(s)) may be provided to the machine learning model(s) by transmitting the electrical signal(s) (or preprocessed electrical signal(s)) to the component of the 5GC 140 (e.g., the server 300). The component of the 5GC 140 (e.g., the server 300) may then provide the intent data back to the BCI device 400, such that the data encoder 470 may encode the intent data for transmission as encoded data (e.g., an SMS message) to the recipient UE (e.g., the UE 110) via the 5GC 140, as illustrated in FIG. 7.

Other examples and uses of the disclosed technology will be apparent to those having ordinary skill in the art upon consideration of the specification and practice of the technology disclosed herein. The specification and examples given should be considered exemplary only, and it is contemplated that the appended claims will cover any other such embodiments or modifications as fall within the true scope of the technology disclosed herein.

The Abstract accompanying this specification is provided to enable the United States Patent and Trademark Office and the public generally to determine quickly from a cursory inspection the nature and gist of the technical disclosure and in no way intended for defining, determining, or limiting the present technology disclosed herein or any of its embodiments.

What is claimed is:

1. A wearable brain computer interface (BCI) device for transmitting communications via a telecommunications network, comprising:

an electrode to measure neurological activity of a user wearing the BCI device, wherein the electrode is in contact with the user;

a model database to store a first machine learning model, the first machine learning model to determine an intent related to the neurological activity of the user;

a communication interface to couple the BCI device to the telecommunications network based on subscriber identity data of an embedded subscriber identity module (eSIM) of the BCI device; and a processing system including one or more electronic processors, the processing system coupled to the electrode and configured to:

receive an electrical signal from the electrode;

apply a filter to the electrical signal to generate a preprocessed electrical signal;

provide the preprocessed electrical signal to the first machine learning model, the machine learning model to extract a pattern from the preprocessed electrical signal and determine, based on the pattern, an intent of the electrical signal;

receive, from the first machine learning model, intent data related to the intent of the electrical signal;

encode the intent data to generate encoded data that is compatible for transmission via the telecommunications network; and transmit, via the communication interface, the encoded data via the telecommunications network to a recipient user equipment.

2. The device of claim 1, wherein the telecommunications network is a fifth generation (5G) new radio (NR) network.

3. The device of claim 1, wherein the encoded data is compatible for transmission via a short message service (SMS) as a SMS message to be transmitted to the recipient user equipment.

4. The device of claim 1, wherein the electrode is an electroencephalogram (EEG) electrode and wherein the electrical signal includes raw EEG data collected using the EEG electrode.

5. The device of claim 1, wherein the device includes:

an embedded subscriber identity module (eSIM) that includes subscriber identity data related to user.

6. The device of claim 5, wherein the processing system is configured to:

establish communication with the telecommunications network using the subscriber identity data of the eSIM.

7. The device of claim 1, wherein the communication interface is a 5G NR communication module configured to facilitate SMS transmission of the encoded data.

8. The device of claim 1, wherein the first machine learning model is a neural network developed using training data related to the user.

9. The device of claim 1, wherein the processing system is configured to:

receive a second machine learning model, the second machine learning model to determine an intent related to neurological activity of the user, wherein the second machine learning model is developed using training data related to a second user wearing a second BCI device;

responsive to receipt of the second machine learning model, store the second machine learning model in the model database such that the second machine learning model replaces the first machine learning model; and responsive to receipt of a subsequent electrical signal from the electrode, utilize the second machine learning model to determine an intent of the subsequent electrical signal.

10. A system to implement a wearable brain computer interface (BCI) device for transmitting communications via a telecommunications network, comprising:

a processing system of the wearable BCI device, the processing system including one or more electronic processors to:

receive an electrical signal from an electrode of the wearable BCI device, the electrode to measure neurological activity of a user wearing the wearable BCI device;

provide the electrical signal to a machine learning model, the machine learning model to extract a pattern from the electrical signal and determine, based on the pattern, an intent of the electrical signal;

receive, from the machine learning model, intent data related to the intent of the electrical signal;

encode the intent data to generate encoded data that is compatible for transmission via a fifth generation (5G) new radio (NR) telecommunications network; and

22 transmit, via a communication interface of the wearable BCI device, the encoded data via the 5G NR telecommunications network to a recipient user equipment, wherein the encoded data is transmitted as a short message service (SMS) message based on subscriber identity data of an embedded subscriber identity module (eSIM) of the wearable BCI device.

11. The system of claim 10, wherein the processing system is configured to provide the electrical signal to the machine learning model by:

transmitting, via the communication interface, the electrical signal to a cloud server of the 5G NR telecommunications network, wherein the machine learning model is stored at the cloud server; and receiving, via the communication interface, from the cloud server of the 5G NR telecommunications network, the intent data generated by the machine learning model.

12. The system of claim 10, wherein the processing system is configured to transmit the encoded data by:

transmitting, via the communication interface, the encoded data to a cloud server of the 5G NR telecommunications network, wherein the cloud server facilitates transmission of the encoded data to the recipient user equipment, the recipient user equipment coupled to the 5G NR telecommunications network.

13. The system of claim 10, wherein the processing system is configured to:

receive, via the communication interface, a notification indicative that the SMS message was transmitted to the recipient user equipment; and responsive to receipt of the notification, provide an alert to the user, wherein the alert is at least one of: an audible alert or a haptic alert.

14. The system of claim 10, wherein the machine learning model is a neural network trained using a collection of electrical signals corresponding to neurological signals.

15. A method to implement a wearable brain computer interface (BCI) device for transmitting communications via a telecommunications network, comprising:

receiving, with a processing system of the wearable BCI device, the processing system including one or more electronic processors, an electrical signal from an electrode of the wearable BCI device, the electrode to measure neurological activity of a user wearing the wearable BCI device;

applying, with the processing system, a filter to the electrical signal to generate a preprocessed electrical signal;

providing, with the processing system, the preprocessed electrical signal to a machine learning model, the machine learning model to extract a pattern from the preprocessed electrical signal and determine, based on the pattern, an intent of the electrical signal;

receiving, with the processing system, from the machine learning model, intent data related to the intent of the electrical signal;

encoding, with the processing system, the intent data to generate encoded data that is compatible for transmission as a short message service (SMS) message via the telecommunications network; and transmitting, with the processing system, the SMS message via the telecommunications network to a recipient user equipment.

16. The method of claim 15, wherein transmitting, with the processing system, the SMS message via the telecommunications network includes transmitting the SMS message based on subscriber identity data of an embedded subscriber identity module (eSIM) of the wearable BCI device.

17. The method of claim 15, wherein transmitting, with the processing system, the SMS message via the telecommunications network includes transmitting, with the processing system, the SMS message via an open radio access (O-RAN) network.

18. The method of claim 15, wherein providing, with the processing system, the preprocessed electrical signal to the machine learning model includes:

transmitting the electrical signal to a server of the telecommunications network, wherein the machine learning model is stored at the server; and receiving, from the server of the telecommunications network, the intent data generated by the machine learning model.

19. The method of claim 15, wherein transmitting, with the processing system, the SMS message via the telecommunications network to the recipient user equipment includes:

transmitting the SMS message to a server of the telecommunications network, wherein the server facilitates transmission of the SMS message to the recipient user equipment, and wherein the recipient user equipment is communicatively coupled to the telecommunications network.

20. The method of claim 15, further comprising:

updating, with the processing system, the machine learning model based on training data related to another wearable BCI device; and responsive to receipt of a subsequent electrical signal from the electrode, utilize the updated machine learning model to determine an intent of the subsequent electrical signal.

\* \* \* \* \*